(12) United States Patent
Zhang et al.

(10) Patent No.: US 8,023,455 B2
(45) Date of Patent: Sep. 20, 2011

(54) SCHEDULING IN MULTI-CELL MULTI-CARRIER WIRELESS SYSTEMS

(75) Inventors: Honghai Zhang, Ewing, NJ (US); Sampath Rangarajan, Bridgewater, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 544 days.

(21) Appl. No.: 12/237,993

(22) Filed: Sep. 25, 2008

(65) Prior Publication Data

US 2009/0232064 A1  Sep. 17, 2009

Related U.S. Application Data

(60) Provisional application No. 61/035,752, filed on Mar. 12, 2008.

(51) Int. Cl.
*H04W 4/00* (2009.01)
*H04J 11/00* (2006.01)

(52) U.S. Cl. ........................... 370/328; 370/203
(58) Field of Classification Search .................. None
See application file for complete search history.

(56) References Cited

U.S. PATENT DOCUMENTS

| | | | |
|---|---|---|---|
| 2005/0068884 A1* | 3/2005 | Yoon et al. | 370/203 |
| 2005/0068916 A1* | 3/2005 | Jacobsen et al. | 370/328 |
| 2008/0240208 A1* | 10/2008 | Lou et al. | 375/211 |
| 2009/0190688 A1* | 7/2009 | Kotecha et al. | 375/267 |
| 2010/0195609 A1* | 8/2010 | Li et al. | 370/329 |
| 2010/0296591 A1* | 11/2010 | Xu et al. | 375/259 |

OTHER PUBLICATIONS

Andrews, M. et al., "Scheduling Algorithms for Multi-Carrier Wireless Data Systems", MobiCom'07, Sep. 9-14, 2007, Montreal, Quebec, Canada, ACM.

Das, S. et al., "Dynamic Load Balancing Through Coordinated Scheduling in Packet Data Systems", IEEE INFOCOM 2003.

Stolyar, A.L. et al., "Self-Organizing Dynamic Fractional Frequency Reuse in OFDMA Systems", IEEE INFOCOM 2008.

* cited by examiner

*Primary Examiner* — Gary Mui
*Assistant Examiner* — Clemence Han
(74) *Attorney, Agent, or Firm* — Joseph Kolodka

(57) ABSTRACT

Transmission is scheduled in a multi-cell multi-carrier wireless network. Assignments are determined for subcarriers by determining marginal gains for receivers, determining a receiver and an associated base station corresponding to a highest marginal gain, and assigning the receiver to the base station. These steps may be iteratively repeated until each of the receivers is assigned to a base station. The subcarriers are then allocated to the receivers by selecting the receiver with the highest gain. Alternatively, assignments are determined for subcarriers by determining a maximum additional queue size reduction, determining an assignment for each of the subcarriers, determining a receiver associated with a base station that has the determined maximum additional queue size reduction, assigning the receiver to the base station, and allocating the subcarriers to the receivers in the base stations.

8 Claims, 6 Drawing Sheets

SCHEDULING IN MULTI-CELL MULTI-CARRIER WIRELESS SYSTEMS

This application claims the benefit of U.S. Provisional Application No. 61/035,752 filed on Mar. 12, 2008, which is incorporated herein by reference.

BACKGROUND OF THE INVENTION

The present invention is related generally to transmission scheduling, and in particular, to scheduling transmission in multi-cell multi-carrier wireless systems.

Scheduling problems in cellular networks arise from excessive loading in the networks, delaying transmissions. Proportional fairness scheduling algorithms have been used. At every slot, the user is served with the largest ratio of the instantaneous service rate to its average service rate.

In Orthogonal Frequency-Division Multiple Access (OFDMA) based multi-carrier systems, scheduling improvements are needed to avoid multi-path interference and to achieve higher spectral efficiency. However, conventional solutions only address scheduling in single-cell networks and do not consider the effect of finite queue size of each user.

Additionally, in conventional scheduling, it was believed that scheduling across multiple cells was not practical due to the large latency and large overhead between base stations and the radio network controller. For this reason, scheduling in multi-cell multi-carrier wireless systems was ignored.

Therefore, there remains a need to improve throughput in multi-cell multi-carrier wireless networks.

BRIEF SUMMARY OF THE INVENTION

In one embodiment of the present invention, a method for transmission in a multi-cell multi-carrier wireless network includes receiving channel state information, determining assignments for a plurality of subcarriers based at least in part on the received channel state information, scheduling transmission based on the subcarrier assignment, and transmitting information based on the scheduled transmission.

In one embodiment of the present invention, assignments are determined for a plurality of subcarriers by determining marginal gains for a plurality of receivers, determining a receiver and an associated base station in a plurality of base stations corresponding to a highest marginal gain, and assigning the determined receiver to the determined base station. These steps may be iteratively repeated until each of the plurality of receivers is assigned to an associated base station. The plurality of subcarriers are then allocated to the plurality of receivers by selecting the receiver with the highest gain among the plurality of receivers assigned to the associated base station for each subcarrier in each base station.

In one embodiment of the present invention, the assignments are determined for a plurality of subcarriers by determining a maximum additional queue size reduction, determining an assignment for each of the plurality of subcarriers based on the determined maximum additional queue size reduction, recording the determined assignments for each of the plurality of subcarriers, determining a receiver from a plurality of receivers associated with a base station from a plurality of base stations that has the determined maximum additional queue size reduction, assigning the receiver from the plurality of receivers to the base station from the plurality of base stations, and allocating the plurality of subcarriers to the plurality of receivers in the plurality of base stations.

The maximum additional queue size reduction is determined by determining a sum of rates for each of the plurality of subcarriers, determining a minimum queue size, determining the maximum additional queue size reduction based at least in part on the determined minimum queue size, and determining a bit allocation for each of the plurality of subcarriers.

These and other advantages of the invention will be apparent to those of ordinary skill in the art by reference to the following detailed description and the accompanying drawings.

DETAILED DESCRIPTION

The present invention is related generally to transmission scheduling, and in particular, to scheduling transmission in multi-cell multi-carrier wireless systems. With the advance of passive optical networks and optical wireless integration, scheduling across multiple cells can be executed. This is advantageous at least because each client (e.g., receiver, user, etc.) may choose the base station with the best signal quality to improve the overall system throughput.

In at least one embodiment of the present invention, users are assigned to subcarriers in each base station in order to maximize the overall system throughput. Load balancing and multi-user/multi-channel diversity are exploited to achieve the maximum throughput.

Figure 1:
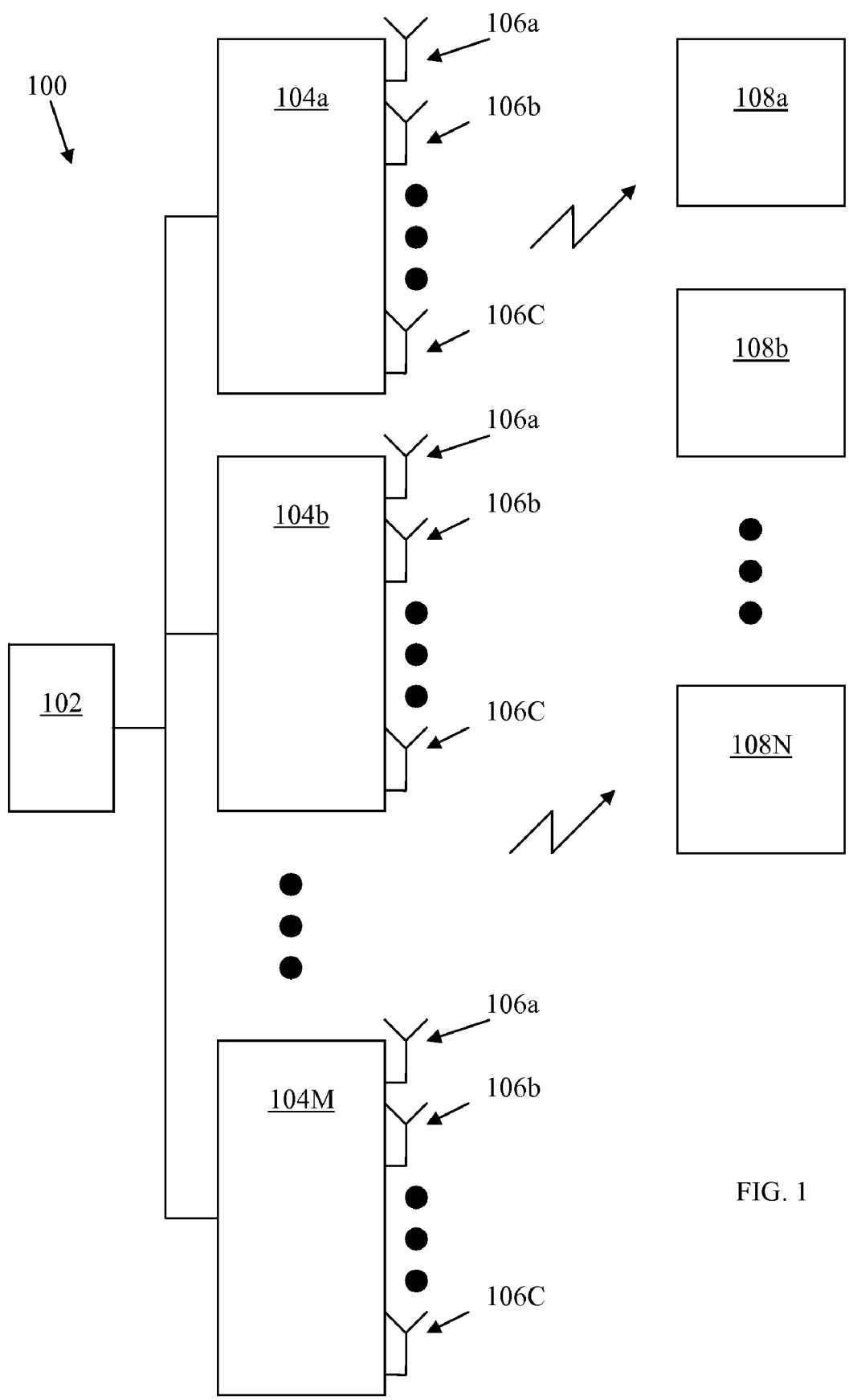
FIG. 1 depicts an exemplary multi-cell multi-carrier wireless network.

FIG. 1 depicts an exemplary multi-cell multi-carrier wireless network 100. Network 100 includes a controller 102 in communication with a plurality of base stations 104$a$, 104$b$, ..., 104M. The base stations 104$a$-104M may transmit signals (e.g., wireless signals) via subcarriers (e.g., in OFDMA systems) 106$a$-106C to a plurality of receivers 108$a$, 108$b$, ..., 108N.

Controller 102 is a device adapted to perform the methods 300, 400, 500, and 600 described below with respective reference to FIGS. 3-6. In at least one embodiment, controller 102 is implemented as a controller 200, described below with respect to FIG. 2.

Controller may be in communication with base stations 104$a$-104M via a high speed network. In at least one embodiment, network 100 may be an optical wireless integrated network and the conventional components of base stations 104$a$-104M are located near controller 102.

Base stations 104$a$-104M are base stations for transmitting information to mobile stations, as is known. Base stations 104$a$-104M may have and/or be a wireless transmitter (e.g., cellular site, satellite, Tx, etc.) as is known. Further, base stations 104$a$-104M may each comprise one or more reception antennas (not shown) for receiving input data and/or feedback signals, etc.

Receivers (e.g., users, mobile stations, mobile users, etc.) 108$a$-108N may be wireless reception devices (e.g. mobile telephone, ground station, Rx, etc.) as are known and may be capable of receiving signals from base stations 104a-104M and/or sending feedback signals to base stations 104a-104M.

Figure 2:
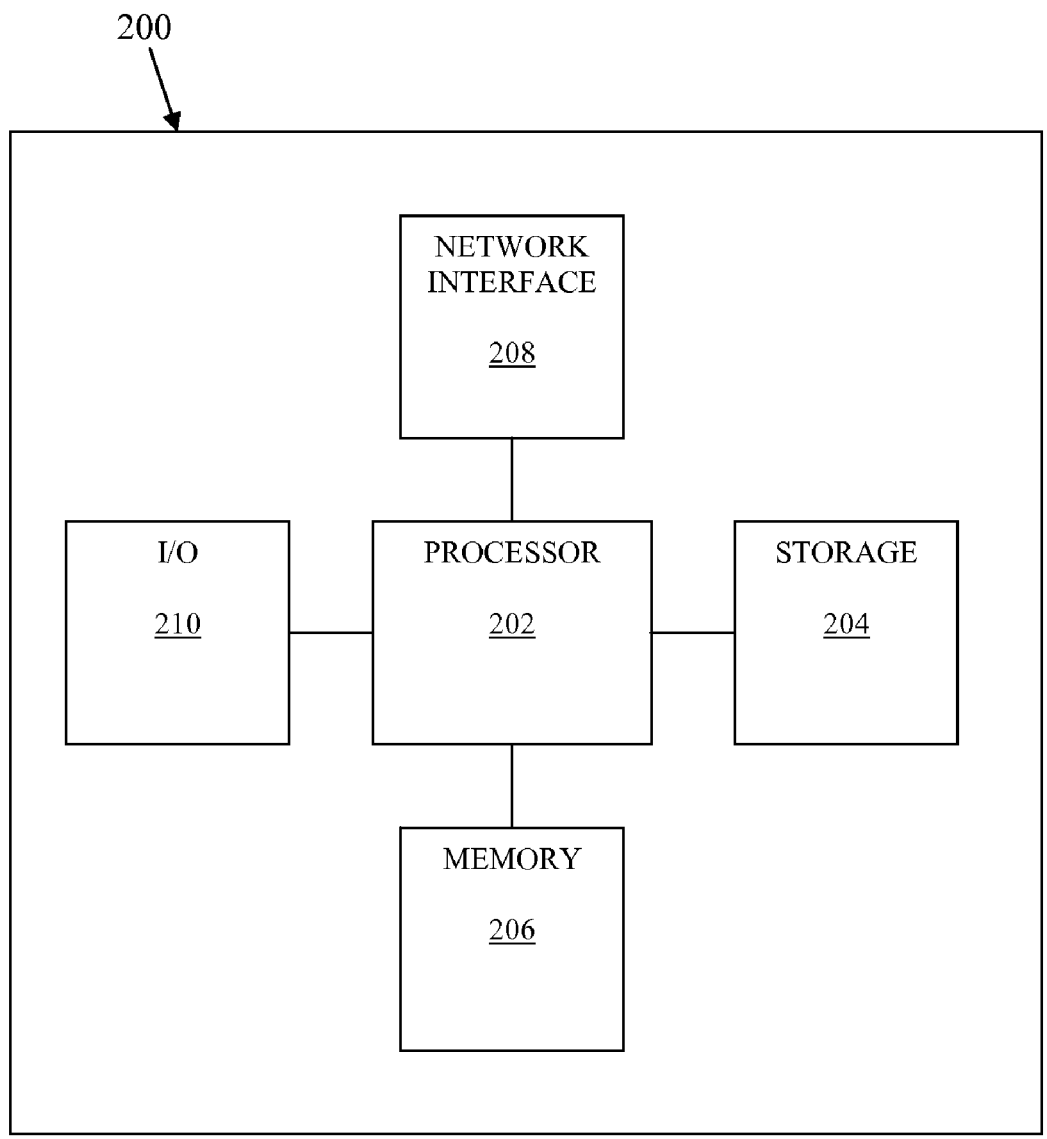
FIG. 2 is a schematic drawing of a controller.

FIG. 2 is a schematic drawing of a controller 200 according to an embodiment of the invention. Controller 200 may be used as the controller 102 in network 100. Controller 200 contains a processor 202 which controls the overall operation of the controller 200 by executing computer program instructions which define such operation. The computer program instructions may be stored in a storage device 204 (e.g., magnetic disk, database, etc.) and loaded into memory 206 when execution of the computer program instructions is desired. Thus, applications for performing the herein-described method steps, such as transmitting data and throughput optimization, in methods 300, 400, 500, and 600 are defined by the computer program instructions stored in the memory 206 and/or storage 204 and controlled by the processor 202 executing the computer program instructions. The controller 200 may also include one or more network interfaces 208 for communicating with other devices via a network (e.g., a peer to peer network, etc.). The controller 200 also includes input/output devices 210 (e.g., display, keyboard, mouse, speakers, buttons, etc.) that enable user interaction with the controller 200. Controller 200 and/or processor 202 may include one or more central processing units, read only memory (ROM) devices and/or random access memory (RAM) devices. One skilled in the art will recognize that an implementation of an actual controller could contain other components as well, and that the controller of FIG. 2 is a high level representation of some of the components of such a controller for illustrative purposes.

According to some embodiments of the present invention, instructions of a program (e.g., controller software) may be read into memory 206, such as from a ROM device to a RAM device or from a LAN adapter to a RAM device. Execution of sequences of the instructions in the program may cause the controller 200 to perform one or more of the method steps described herein, such as those described below with respect to methods 300, 400, 500, and 600. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 206 may store the software for the controller 200, which may be adapted to execute the software program and thereby operate in accordance with the present invention and particularly in accordance with the methods described in detail above. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled and/or encrypted format. The programs furthermore may include program elements that may be generally useful, such as an operating system, a database management system, and device drivers for allowing the controller to interface with computer peripheral devices, and other equipment/components. Appropriate general purpose program elements are known to those skilled in the art, and need not be described in detail herein.

Figure 3:
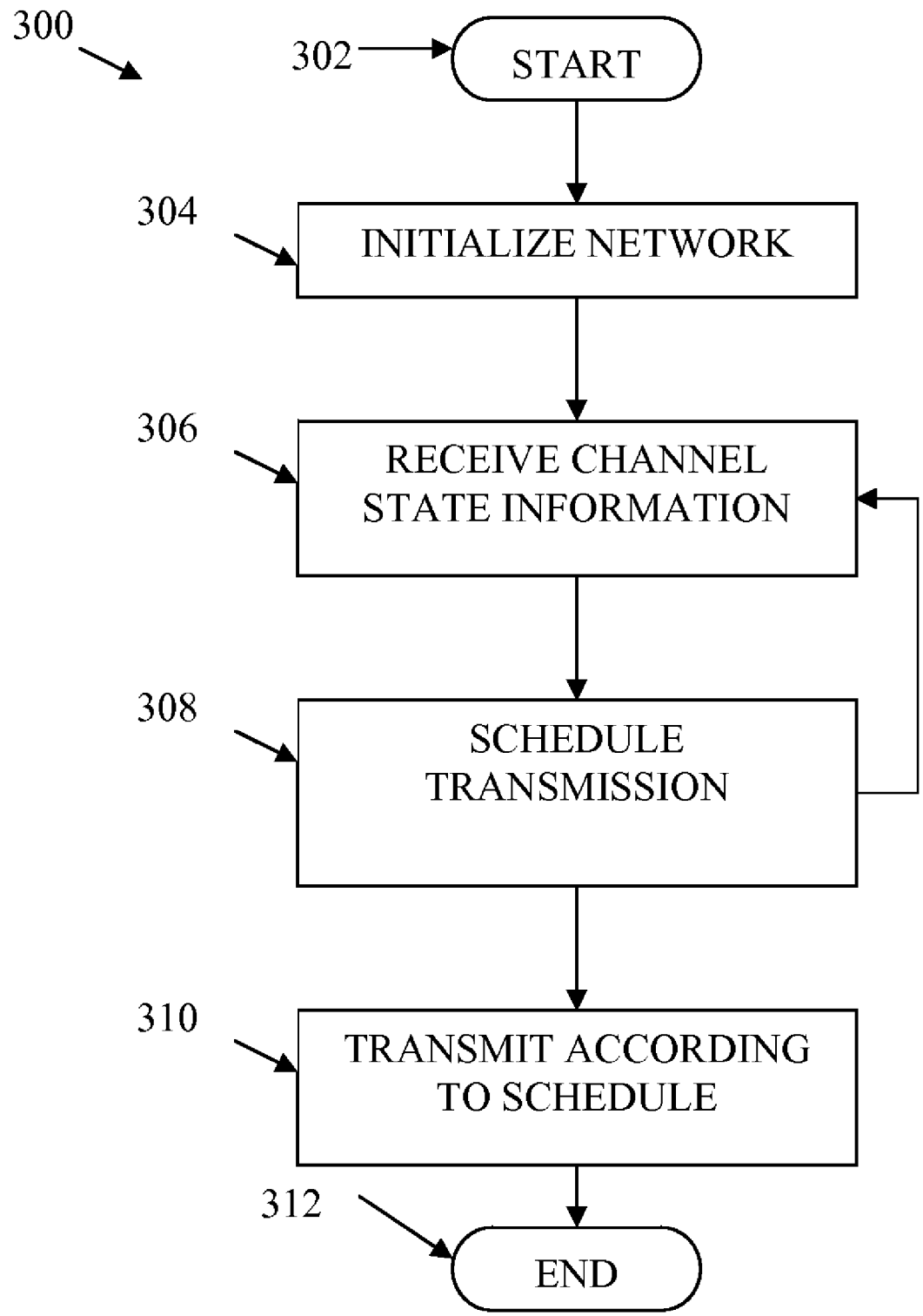
FIG. 3 is a flowchart of a method of network scheduling according to an embodiment of the present invention.

FIG. 3 is a flowchart of a method 300 of network transmission according to an embodiment of the present invention. Method 300 may be performed (e.g., implemented) by controller 102 and/or base stations 104a-104M of network 100. The method 300 starts at step 302.

In step 304, the network is initialized. Network 100 is initialized to set up connections and quality of service requirements for each receiver 108a-108N.

In step 306, channel state information is received. Channel state information is received from each receiver 108a-108N on each subcarrier 106a-106C in each base station 104a-104M at each frame t. The received channel state information includes the achievable rate for each receiver 108a-108N on each subcarrier 106a-106C in each base station 104a-104M. In at least one embodiment, only partial channel state information is received. For example, a receiver 108a-108N may only report the data rate on those subcarriers 106a-106C with a rate higher than a certain threshold. Controller 102 may then treat unreported channel gain (e.g., data rate) as zero in the scheduling determination described below with respect to methods 400 and 500.

In step 308, transmission is scheduled. In at least one embodiment, transmission is scheduled by determining subcarrier assignment. Controller 102 determines the subcarrier 106a-106C assignment based at least in part on the achievable rate for each receiver 108a-108N on each subcarrier 106a-106C in each base station 104a-104M from step 306. In at least one embodiment, controller 102 determines the subcarrier 106a-106C assignment based additionally on a queue size of each receiver 108a-108N.

In step 310, signals are transmitted according to the transmission schedule of step 308. Signals are transmitted from bas stations 104a-104M to receivers 108a-108N via subcarriers 106a-106C.

In at least one embodiment, the method 300 returns control to step 306 and further channel state information is received. That is, the frame is incremented (t=t+1) and the method 300 repeats iteratively.

The method 300 ends in step 312.

Subcarrier assignment is discussed in further detail below with respect to methods 400 and 500 of FIGS. 4 and 5.

Figure 4:
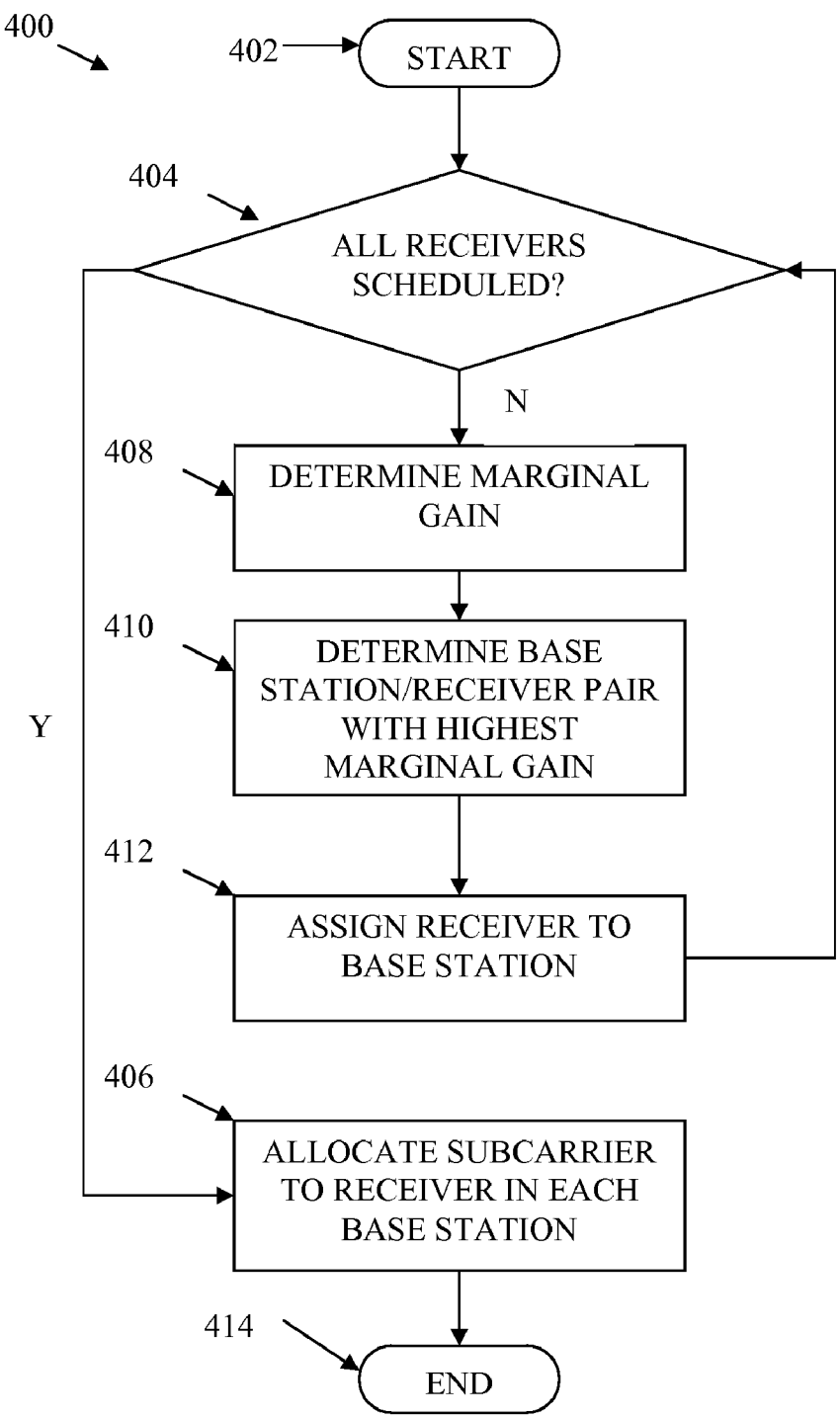
FIG. 4 is a flowchart of a method of transmission scheduling according to an embodiment of the present invention.

FIG. 4 is a flowchart of a method 400 of transmission scheduling according to an embodiment of the present invention. The method 400 may be performed by controller 102 as described above. In method 400, each receiver 108a-108N is served by multiple base stations 104a-104M on different subcarriers 106a-106C. In at least one embodiment, the scheduling of method 400 may be used in the determination of subcarrier assignment in step 308 of method 300 above. Method 400 may be used in scheduling transmission in a backlogged transmission system. The method begins at step 402.

In step 404, a determination is made as to whether all receivers are assigned. If all receivers 108a-108N are assigned, the method proceeds to step 406 and subcarriers are allocated, as discussed below. If not all of the receivers are assigned, the method proceeds to step 408 and the marginal gain is determined.

The marginal gain $\Delta g_{ij}$ is determined for each unassigned receiver j (e.g., of receivers 108a-108N) and each base station i (e.g., of base stations 104a-104M). The marginal gain $\Delta g_{ij}$ may be determined as follows.

If the gain of each receiver j on subcarrier c in base station i is $a_{ijc} = w_{ij} r_{ijc}$ and $S_i$ is the set of receivers assigned to base station i, $$\Delta g_{ij} = \sum_c \max_{k \in S_i \cup \{j\}} a_{ikc} - \max_{k \in S_i} a_{ikc} = \sum_c \max(0, a_{ijc} - \max_{k \in S_i} a_{ikc}).$$

In step 410, the base station and receiver pair with the highest marginal gain is determined. Based on this determination, the receiver is assigned to the base station in step 412. That is, receiver $j_0$ is assigned to the base station $i_0$. That is, $S_{i_0}=S_{i_0}\cup\{j_0\}, U=U-\{j_0\}$ where U is the set of unassigned receivers.

The method 400 then returns control to step 404 and the determination as to whether all receivers are assigned is made again. As before, if all receivers are assigned, the method proceeds to step 406 and subcarriers are allocated. Subcarriers (e.g., subcarriers 106a-106C) are allocated to receivers in each base station by selecting the receiver with the highest gain (e.g., weight multiplied by data rate) among the receivers that have been assigned to the same base station for each subcarrier in each base station.

After allocation of subcarriers in step 406, the method ends at step 414. In an alternative embodiment, at each of method steps 408 to 412, a fixed receiver is chosen and the best base station is selected to accept the receiver base on the maximum marginal gain $\Delta g_{ij}$.

Figure 5:
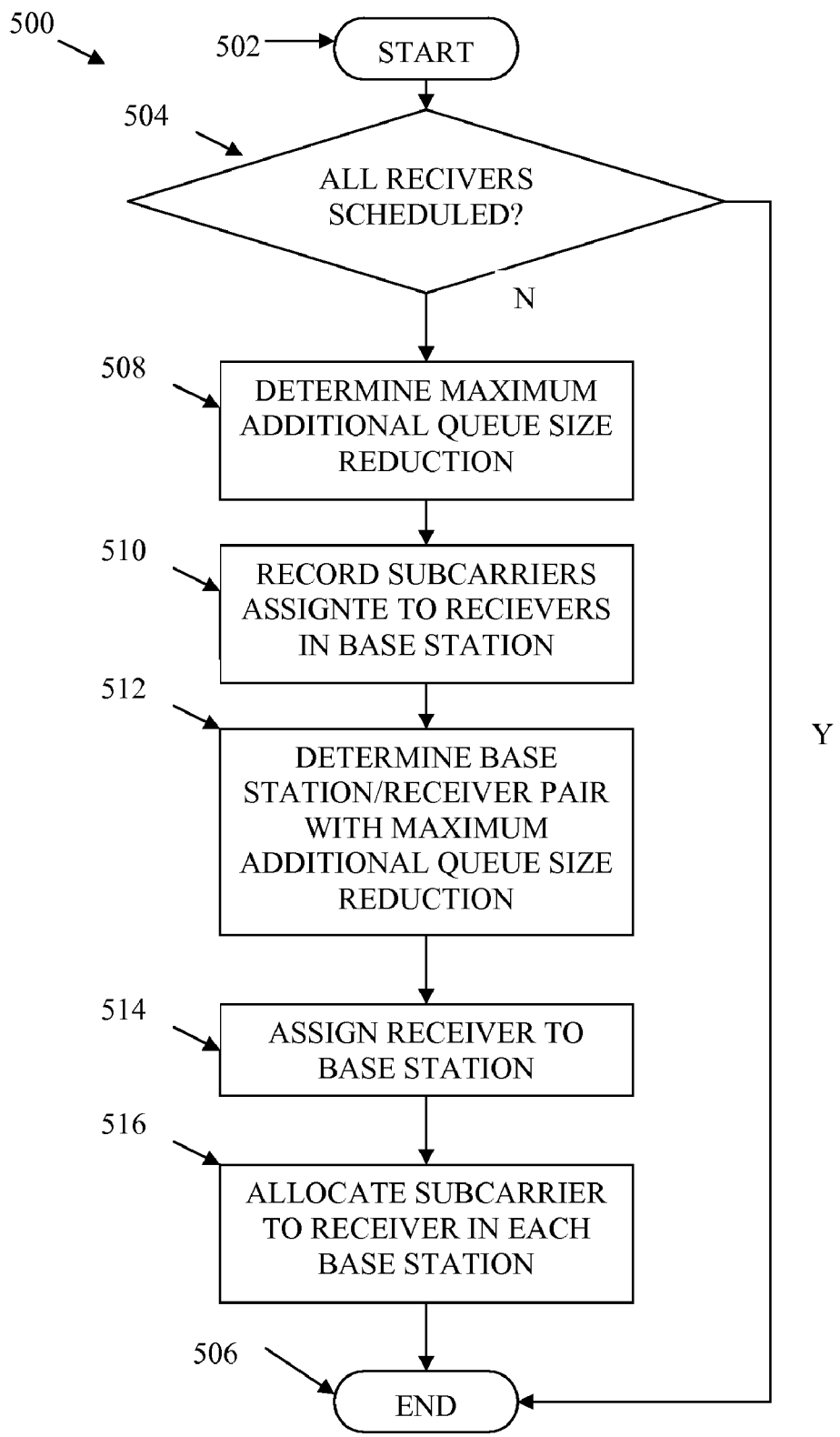
FIG. 5 is a flowchart of a method of transmission scheduling according to an embodiment of the present invention.

FIG. 5 is a flowchart of a method 500 of transmission scheduling according to an embodiment of the present invention. The method 500 may be performed by controller 102 as described above. In method 500, each receiver 108a-108N is served by multiple base stations 104a-104M on different subcarriers 106a-106C. In at least one embodiment, the scheduling of method 500 may be used in the determination of subcarrier assignment in step 308 of method 300 above. Method 500 may be used in scheduling transmission in a transmission system with finite queuing fed by an arrival process. That is, both receiver rates and queue sizes are available to controller 102. The method begins at step 502.

In step 504, a determination is made as to whether all receivers are assigned. If all receivers 108a-108N are assigned, the method proceeds to step 506 and the method 500 ends. If not all of the receivers are assigned, the method proceeds to step 508 and the maximum additional queue size reduction is determined.

The maximum additional queue size reduction $\Delta q_{ij}$ is determined for each unassigned receiver j and base station i. In at least one embodiment, the maximum additional queue size reduction is determined using dynamic programming, as described below with respect to method 600 of FIG. 6.

In step 510, the subcarriers assigned to receivers in a base station are recorded. That is, the subcarriers c(i,j) assigned to receiver j in base station i to achieve the additional queue size reduction $\Delta q_{ij}$ is recorded. In at least one embodiment, this is recorded in a memory (e.g., memory 206 and/or storage 204 in controller 102).

In step 512, the base station and receiver pair that has the maximum additional queue size reduction is determined. That is, the base station/receiver pair $(i_0,j_0)$ that has the maximum additional queue size reduction $\Delta q_{ij}$ is determined.

In step 514, the receiver from step 512 is assigned to the base station. That is, the receiver $j_0$ is assigned to the base station $i_0$.

In step 516, subcarriers are allocated. Subcarrier $c(i_0,j_0)$ (e.g., subcarriers 106a-106C) is allocated in base station $i_0$ to receiver $j_0$. All previous allocations to the subcarriers are removed. Following subcarrier allocation in step 516, the method 500 returns control to step 504 and the determination as to whether all receivers are assigned is made again. As before, if all receivers are assigned, the method proceeds to step 506 and ends.

In an alternative embodiment, for method steps 508-516, a fixed receiver is chosen and the best base station that achieves maximum $\Delta q_{ij}$ is selected to accept the receiver.

Figure 6:
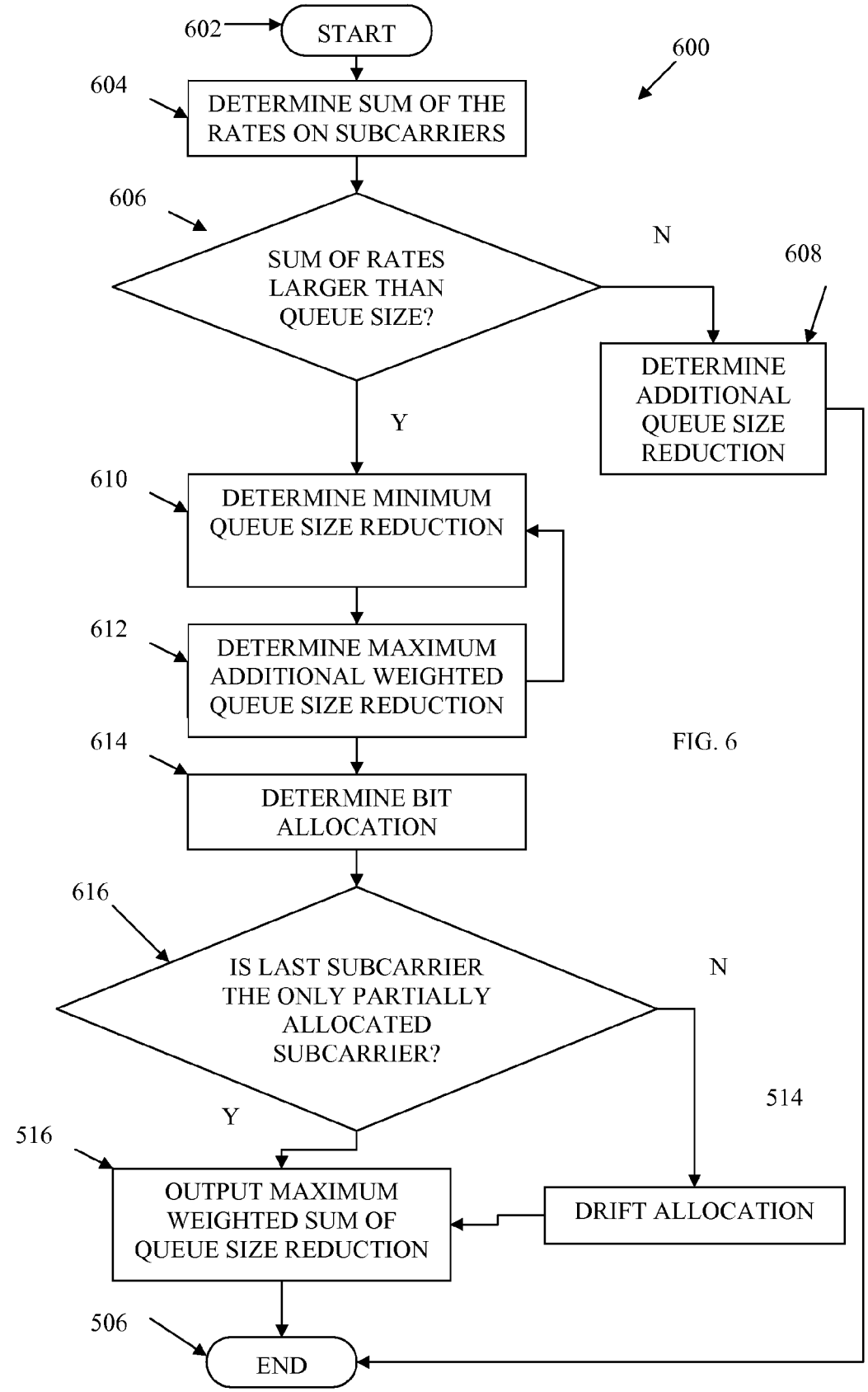
FIG. 6 depicts a flowchart of a method 600 of determining maximum additional queue size reduction according to an embodiment of the present invention.

FIG. 6 depicts a flowchart of a method 600 of determining maximum additional queue size reduction according to an embodiment of the present invention. Method 600 may be used in determining the maximum additional queue size reduction as in method step 512 of method 500 above. Accordingly, method 600 may be performed by controller 102 of network 100.

Without loss of generality, the frame duration is assumed to be one time unit. Otherwise, the data rate may be multiplied on each subcarrier (e.g., subcarriers 106a-106C) by the frame duration. The method begins at step 602.

Method 600 is used to determine the maximum additional queue size reduction as $$\max \sum_c \max(0, w_j u_{ijc} - v_{ic})$$

such that $u_{ijc} \leq r_{ijc}$ for any c and $$\sum_c u_{ijc} \leq q_j$$

where $w_j$ is the weight of the receiver j, $v_{ic}$ is the current weighted reduction on subcarrier c, $q_j$ is the queue size of receiver j, and $u_{ijc}$ is a variable. This may be expressed as $$\max \sum_c \max(0, u_{ijc} - v'_{ic})$$

where $v'_{ic} = v_{ic}/w_j$.

In step 604, the sum of the rates on subcarriers is determined. The sum of the rates is calculated on subcarriers for which the receiver j has a higher gain (e.g., weighted data rate).

In step 606, a determination is made as to whether the sum of the rates from step 604 is larger than the total queue size of receiver j. That is, a comparison is made of the sum of the rates from step 604 to the total queue size of receiver j. If the sum of the rates is equal to or smaller than the total queue size of receiver j, this falls to the backlogged traffic model and the additional queue size reduction is determined in step 608 as $\Delta q_{ij}$ as determined above with respect to step 408 of method 400. The method then proceeds to step 622 and ends. If the sum of the rates is larger than the total queue size of receiver j, the method proceeds to step 610 and a minimum queue size required to achieve additional queue size reduction p is determined.

$Q_k(p)$ is the minimum queue size used to have additional queue size reduction p using the first k subcarriers. $Q_k(p)$ is initially $$Q_1(p) = \begin{cases} 0 & \text{if } p \leq 0 \\ v'_{i1} + p & \text{if } 0 < p \leq r_{ij1} - v'_{i1} \\ \infty & \text{if } p > r_{ij1} - v'_{i1} \end{cases}$$

The recursive equation of $Q_k(p)$ is $$Q_k(p) = \begin{cases} \min(Q_{k-1}(p), p + v'_{ik}) & \text{if } p < r_{ijk} - v'_{ik} \\ \min(Q_{k-1}(p), r_{ijk} + Q_{k-1}(p - (r_{ijk} - v'_{ik}))) & \text{else} \end{cases}.$$

Based on the initial conditions and recursive equations, $Q_k(p)$ is determined using dynamic programming.

In step 612, the maximum additional weighted queue size reduction is determined. The maximum value p is determined such that $Q_k(p) \leq q_j$ where $q_j$ is the queue size of receiver j. Steps 610 and 612 may be repeated for all k=1, . . . , K where K is the number of subcarriers. That is, $Q_k(p)$ is determined for each of the available subcarriers.

In step 614, bit allocations are determined. The bit allocations on each subcarrier k may be found using traditional backtracking or any other equivalent method.

In step 616, a determination is made as to whether the last subcarrier is the only partially allocated subcarrier. If the last subcarrier is the only partially allocated subcarrier the method proceeds to step 618 and the determined maximum weighted sum of queue size reduction for each receiver is output. In at least one embodiment, the determined maximum weighted sum of queue size reduction for each receiver is output to controller 102 (e.g., for use in method 500 above). The method ends at step 622.

If the last subcarrier is not the only partially allocated subcarrier the method proceeds to step 620 and the allocation is drifted from the last subcarrier allocated to receiver j to the first allocated subcarrier to make the last subcarrier the only partially allocated subcarrier. In this way, it is not necessary to try all possible subcarriers as the last partially allocated subcarrier. Alternatively, the recursive equation may be started backwards resulting in the only partially allocated subcarrier being the last allocated subcarrier.

The method then proceeds to step 618 and the determined maximum weighted sum of queue size reduction for each receiver is output.

In an alternative embodiment, prior to dynamic programming in step 610, the weighted sum of the data rates on all subcarriers, where the data rate for receiver j is larger than the current allocation, is determined. If it is less than the queue size of receiver j, the optimal solution is the weighted sum of the data rate increase due to receiver j, which is $\Delta g_{ij}$, as described above with respect to step 408 of method 400.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for transmission in a multi-cell multi-carrier wireless network comprising:
   receiving channel state information;
   determining assignments for a plurality of subcarriers based at least in part on the received channel state information; and
   scheduling transmission based on the subcarrier assignment,
   wherein said determining assignments for the plurality of subcarriers comprises:
   (a) determining marginal gains for a plurality of receivers;
   (b) determining a receiver and an associated base station in a plurality of base stations corresponding to a highest marginal gain; and
   (c) assigning the determined receiver to the determined base station.

2. The method of claim 1 further comprising:
   transmitting information based on the scheduled transmission.

3. The method of claim 1 further comprising:
   iteratively repeating steps (a) to (c) until each of the plurality of receivers is assigned to an associated base station; and
   allocating the plurality of subcarriers to the plurality of receivers by selecting the receiver with the highest gain among the plurality of receivers assigned to the associated base station for each subcarrier in each base station.

4. The method of claim 1 wherein said determining marginal gains for a plurality of receivers comprises determining $$\Delta g_{ij} = \sum_c \max\left(0, a_{ijc} - \max_{k \in S_i} a_{ikc}\right)$$

where $\Delta g_{ij}$ is the marginal gain, j is the plurality of receivers, i is the plurality of base stations, c is the plurality of subcarriers associated with the plurality of base stations i, $S_i$ is the set of receivers assigned to base station j, and $a_{ijc}$ is the gain of each receiver j on subcarrier c in basestation i.

5. The method of claim 1 wherein said determining assignments for the plurality of subcarriers comprises:
   determining a maximum additional queue size reduction;
   determining an assignment for each of the plurality of subcarriers based on the determined maximum additional queue size reduction;
   recording the determined assignments for each of the plurality of subcarriers;
   determining a receiver from a plurality of receivers associated with a base station from a plurality of base stations that has the determined maximum additional queue size reduction;
   assigning the receiver from the plurality of receivers to the base station from the plurality of base stations; and
   allocating the plurality of subcarriers to the plurality of receivers in the plurality of base stations.

6. The method of claim 5 wherein said determining a maximum additional queue size reduction comprises:
   determining a sum of rates for each of the plurality of subcarriers;

determining a minimum queue size to achieve each additional queue size reduction p;
determining the maximum additional queue size reduction based at least in part on the determined minimum queue size; and
determining a bit allocation for each of the plurality of subcarriers.

7. The method of claim 6 wherein said determining a minimum queue size comprises determining the minimum queue size using dynamic programming.

8. The method of claim 6 further comprising:
determining if a last subcarrier of the plurality of subcarriers is the only partially allocated subcarrier; and
drifting an allocation of the last subcarrier to a first subcarrier of the plurality of subcarriers if the last subcarrier of the plurality of subcarriers is not the only partially allocated subcarrier.

* * * * *